(12) United States Patent
Fox et al.

(10) Patent No.: US 8,412,746 B2
(45) Date of Patent: Apr. 2, 2013

(54) METHOD AND SYSTEM FOR FEDERATED QUERYING OF DATA SOURCES

(75) Inventors: Joshua Fox, Emek Ha'ela (IL); Rannen Meir, Jerusalem (IL); Zvi Schreiber, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 2090 days.

(21) Appl. No.: 11/026,358

(22) Filed: Dec. 29, 2004

(65) Prior Publication Data

US 2005/0234889 A1 Oct. 20, 2005

Related U.S. Application Data

(63) Continuation-in-part of application No. 10/637,339, filed on Aug. 8, 2003, now Pat. No. 7,877,421, which is a continuation-in-part of application No. 10/340,068, filed on Jan. 9, 2003, now abandoned, which is a (Continued)

(51) Int. Cl.
*G06F 7/00* (2006.01)
*G06F 17/00* (2006.01)
*G06F 17/30* (2006.01)

(52) U.S. Cl. .................... 707/803; 707/609; 707/799

(58) Field of Classification Search .................... None
See application file for complete search history.

(56) References Cited

U.S. PATENT DOCUMENTS

| | | |
|---|---|---|
| 5,295,242 A | 3/1994 | Mashruwala et al. |
| 5,499,371 A | 3/1996 | Henninger et al. |
| 5,627,979 A | 5/1997 | Chang et al. |
| 5,710,917 A | 1/1998 | Musa et al. |
| 5,734,887 A | 3/1998 | Kingberg et al. |
| 5,768,580 A | 6/1998 | Wical |
| 5,799,309 A | 8/1998 | Srinivasan |
| 5,838,965 A | 11/1998 | Kavanagh et al. |
| 5,857,197 A | 1/1999 | Mullins |
| 5,873,093 A | 2/1999 | Williamson et al. |
| 5,878,434 A | 3/1999 | Draper et al. |
| 5,905,987 A | 5/1999 | Shutt et al. |

(Continued)

FOREIGN PATENT DOCUMENTS

| | | |
|---|---|---|
| GB | 2399665 A | 9/2004 |
| JP | 2001092827 A | 4/2001 |

(Continued)

OTHER PUBLICATIONS

Irani, Romin, "Enabling Web SErvices with BEA WebLogic" Sep. 26, 2001, pp. 1-4. http://www.webservicesarchitect.com/content/articles/irrani05.asp.

(Continued)

*Primary Examiner* — Susan Chen
(74) *Attorney, Agent, or Firm* — Yee & Associates, P.C.; Susan Murray (57) ABSTRACT

A system for managing and querying a plurality of data sources, including an interface to a plurality of inter-related data sources of diverse types, each of the plurality of data sources having a schema that describes its data structure, a schema generator communicating with the interface, for generating a federated schema that describes the structures of the plurality of data sources and their inter-relationships, and for modifying the federated schema over time as the plurality of data sources undergo changes, and a query generator communicating with the schema generator, for generating a query for the federated schema. A method and a computer-readable storage medium are also described.

53 Claims, 5 Drawing Sheets

Related U.S. Application Data continuation-in-part of application No. 10/302,370, filed on Nov. 22, 2002, now Pat. No. 7,673,282, which is a continuation-in-part of application No. 10/159,516, filed on May 31, 2002, now abandoned, which is a continuation-in-part of application No. 10/104,785, filed on Mar. 22, 2002, now Pat. No. 7,146,399, which is a continuation-in-part of application No. 10/053,045, filed on Jan. 15, 2002, now abandoned, which is a continuation-in-part of application No. 09/866,101, filed on May 25, 2001, now Pat. No. 7,099,885.

(56) References Cited

U.S. PATENT DOCUMENTS

| | | | |
|---|---|---|---|
| 5,937,409 A | 8/1999 | Wetherbee | |
| 5,950,190 A | 9/1999 | Yeager et al. | |
| 5,970,490 A | 10/1999 | Morgenstern | |
| 5,995,756 A | 11/1999 | Herrmann | |
| 6,003,034 A | 12/1999 | Tuli | |
| 6,014,666 A | 1/2000 | Helland et al. | |
| 6,035,342 A | 3/2000 | Bernstein et al. | |
| 6,112,201 A | 8/2000 | Wical | |
| 6,173,289 B1 | 1/2001 | Sonderegger et al. | |
| 6,175,837 B1 | 1/2001 | Sharma et al. | |
| 6,192,365 B1 | 2/2001 | Draper et al. | |
| 6,199,059 B1 | 3/2001 | Dahan et al. | |
| 6,219,654 B1 | 4/2001 | Ruffin | |
| 6,233,586 B1 | 5/2001 | Chang et al. | |
| 6,289,338 B1 | 9/2001 | Stoffel et al. | |
| 6,292,804 B1 | 9/2001 | Ardoin et al. | |
| 6,301,584 B1 | 10/2001 | Ranger | |
| 6,311,194 B1 | 10/2001 | Sheth et al. | |
| 6,317,783 B1 | 11/2001 | Freishtat et al. | |
| 6,327,593 B1 | 12/2001 | Goiffen | |
| 6,343,265 B1 | 1/2002 | Glebov et al. | |
| 6,347,307 B1 | 2/2002 | Sandhu et al. | |
| 6,374,252 B1 | 4/2002 | Althoff et al. | |
| 6,397,232 B1 | 5/2002 | Cheng-Hung et al. | |
| 6,424,973 B1 | 7/2002 | Baclawski | |
| 6,424,974 B1 | 7/2002 | Cotner et al. | |
| 6,446,110 B1 | 9/2002 | Lection et al. | |
| 6,497,943 B1 | 12/2002 | Jimarez et al. | |
| 6,498,795 B1 | 12/2002 | Zhang et al. | |
| 6,513,059 B1 | 1/2003 | Gupta et al. | |
| 6,523,036 B1 | 2/2003 | Hickman et al. | |
| 6,526,416 B1 | 2/2003 | Long | |
| 6,532,471 B1 | 3/2003 | Ku et al. | |
| 6,560,595 B1 | 5/2003 | Sanders et al. | |
| 6,569,207 B1 | 5/2003 | Sundaresan | |
| 6,578,046 B2 | 6/2003 | Chang et al. | |
| 6,591,272 B1 | 7/2003 | Williams | |
| 6,604,100 B1 | 8/2003 | Fernandez et al. | |
| 6,633,869 B1 | 10/2003 | Duparcmeur et al. | |
| 6,633,878 B1 | 10/2003 | Underwood | |
| 6,640,231 B1 | 10/2003 | Andersen et al. | |
| 6,651,244 B1 | 11/2003 | Smith et al. | |
| 6,654,734 B1 | 11/2003 | Mani et al. | |
| 6,687,873 B1 | 2/2004 | Ballantyne et al. | |
| 6,704,744 B1 | 3/2004 | Williamson et al. | |
| 6,708,161 B2 | 3/2004 | Tenorio et al. | |
| 6,708,186 B1 | 3/2004 | Claborn et al. | |
| 6,710,753 B2 | 3/2004 | Gillespie et al. | |
| 6,711,579 B2 | 3/2004 | Balakrishnan | |
| 6,711,585 B1 | 3/2004 | Copperman et al. | |
| 6,718,320 B1 | 4/2004 | Subramanian et al. | |
| 6,725,231 B2 | 4/2004 | Hu et al. | |
| 6,728,692 B1 | 4/2004 | Martinka et al. | |
| 6,732,109 B2 | 5/2004 | Lindberg et al. | |
| 6,732,175 B1 | 5/2004 | Abjanic | |
| 6,742,054 B1 | 5/2004 | Upton, IV | |
| 6,748,583 B2 | 6/2004 | Aizenbud-Reshef et al. | |
| 6,754,670 B1 | 6/2004 | Lindsay et al. | |
| 6,760,734 B1 | 7/2004 | Stephens | |
| 6,772,031 B1 | 8/2004 | Strand | |
| 6,778,990 B2 | 8/2004 | Garcia et al. | |
| 6,792,580 B2 | 9/2004 | Kawakatsu | |
| 6,847,974 B2 | 1/2005 | Wachtel | |
| 6,871,204 B2 | 3/2005 | Krishnaprasad et al. | |
| 6,874,146 B1 | 3/2005 | Iyengar | |
| 6,892,238 B2 | 5/2005 | Lee et al. | |
| 6,898,618 B1 | 5/2005 | Slaughter et al. | |
| 6,947,943 B2 | 9/2005 | DeAnna et al. | |
| 6,957,214 B2 | 10/2005 | Silberberg et al. | |
| 6,978,257 B1 | 12/2005 | Halbout et al. | |
| 6,985,905 B2 | 1/2006 | Prompt et al. | |
| 6,996,566 B1 | 2/2006 | George et al. | |
| 6,999,956 B2 | 2/2006 | Mullins et al. | |
| 7,007,029 B1 | 2/2006 | Chen | |
| 7,024,425 B2 | 4/2006 | Krishnaprasad et al. | |
| 7,027,974 B1 | 4/2006 | Busch et al. | |
| 7,093,200 B2 | 8/2006 | Schreiber et al. | |
| 7,096,224 B2 | 8/2006 | Murthy et al. | |
| 7,099,885 B2 | 8/2006 | Hellman et al. | |
| 7,111,297 B1 | 9/2006 | Sankaranarayan et al. | |
| 7,146,399 B2 | 12/2006 | Fox et al. | |
| 7,200,563 B1 * | 4/2007 | Hammitt et al. | 705/7 |
| 7,254,589 B2 | 8/2007 | Goodwin et al. | |
| 7,278,164 B2 | 10/2007 | Raiz et al. | |
| 7,302,410 B1 | 11/2007 | Venkatraman et al. | |
| 7,315,849 B2 | 1/2008 | Bakalash et al. | |
| 7,472,137 B2 | 12/2008 | Edelstein et al. | |
| 7,475,084 B2 | 1/2009 | Edelstein et al. | |
| 7,533,107 B2 | 5/2009 | Gupta et al. | |
| 7,533,124 B2 | 5/2009 | Hellman et al. | |
| 7,673,282 B2 | 3/2010 | Amaru et al. | |
| 7,739,223 B2 | 6/2010 | Vaschillo et al. | |
| 7,877,421 B2 | 1/2011 | Berger et al. | |
| 7,921,098 B2 | 4/2011 | Edelstein et al. | |
| 7,930,293 B2 | 4/2011 | Fox et al. | |
| 7,962,503 B2 | 6/2011 | Edelstein et al. | |
| 8,060,531 B2 | 11/2011 | Edelstein et al. | |
| 2002/0059183 A1 | 5/2002 | Chen | |
| 2002/0059187 A1 | 5/2002 | Delo et al. | |
| 2002/0059425 A1 | 5/2002 | Belfiore et al. | |
| 2002/0059566 A1 | 5/2002 | Delcambre et al. | |
| 2002/0073236 A1 | 6/2002 | Helgeson et al. | |
| 2002/0087571 A1 | 7/2002 | Stapel et al. | |
| 2002/0087620 A1 | 7/2002 | Rouse et al. | |
| 2002/0099738 A1 | 7/2002 | Grant | |
| 2002/0107844 A1 | 8/2002 | Cha et al. | |
| 2002/0120685 A1 | 8/2002 | Srivastava et al. | |
| 2002/0133484 A1 | 9/2002 | Chau et al. | |
| 2002/0133569 A1 | 9/2002 | Huang et al. | |
| 2002/0143819 A1 | 10/2002 | Han et al. | |
| 2002/0169842 A1 | 11/2002 | Christensen et al. | |
| 2002/0194154 A1 | 12/2002 | Levy et al. | |
| 2003/0018616 A1 | 1/2003 | Wilbanks et al. | |
| 2003/0036917 A1 | 2/2003 | Hite et al. | |
| 2003/0050932 A1 | 3/2003 | Pace et al. | |
| 2003/0093471 A1 | 5/2003 | Upton | |
| 2003/0101170 A1 | 5/2003 | Edelstein et al. | |
| 2003/0110055 A1 | 6/2003 | Chau | |
| 2003/0120665 A1 | 6/2003 | Fox et al. | |
| 2003/0126136 A1 | 7/2003 | Omoigui | |
| 2003/0149934 A1 | 8/2003 | Worden | |
| 2003/0163450 A1 | 8/2003 | Borenstein et al. | |
| 2003/0163597 A1 * | 8/2003 | Hellman et al. | 709/316 |
| 2003/0167445 A1 | 9/2003 | Su et al. | |
| 2003/0172368 A1 * | 9/2003 | Alumbaugh et al. | 717/106 |
| 2003/0177481 A1 | 9/2003 | Amaru et al. | |
| 2003/0179228 A1 | 9/2003 | Schreiber et al. | |
| 2003/0191608 A1 | 10/2003 | Anderson et al. | |
| 2003/0233224 A1 | 12/2003 | Marchisio et al. | |
| 2004/0010491 A1 | 1/2004 | Riedinger | |
| 2004/0054690 A1 | 3/2004 | Hillerbrand et al. | |
| 2004/0093344 A1 | 5/2004 | Berger et al. | |
| 2004/0093559 A1 | 5/2004 | Amaru et al. | |
| 2004/0117346 A1 | 6/2004 | Stoffel et al. | |
| 2004/0216030 A1 | 10/2004 | Hellman et al. | |
| 2004/0220893 A1 | 11/2004 | Spivack et al. | |
| 2005/0038629 A1 | 2/2005 | Amaru et al. | |
| 2005/0060371 A1 | 3/2005 | Cohen et al. | |
| 2005/0080656 A1 | 4/2005 | Crow et al. | |

| | | | |
|---|---|---|---|
| 2005/0138173 A1 | 6/2005 | Ha et al. |
| 2005/0149484 A1 | 7/2005 | Fox et al. |
| 2005/0197926 A1 | 9/2005 | Chinnappan et al. |
| 2005/0216500 A1 | 9/2005 | Edelstein et al. |
| 2005/0240606 A1 | 10/2005 | Edelstein et al. |
| 2005/0251533 A1 | 11/2005 | Harken et al. |
| 2005/0267871 A1 | 12/2005 | Marchisio et al. |
| 2006/0064666 A1 | 3/2006 | Amaru et al. |
| 2006/0156253 A1 | 7/2006 | Schreiber et al. |
| 2006/0167927 A1 | 7/2006 | Edelstein et al. |
| 2006/0167946 A1 | 7/2006 | Hellman et al. |
| 2006/0218177 A1 | 9/2006 | Chang et al. |
| 2007/0038500 A1 | 2/2007 | Hammitt et al. |
| 2008/0140549 A1 | 6/2008 | Eder |
| 2008/0313232 A1 | 12/2008 | Edelstein et al. |
| 2009/0077051 A1 | 3/2009 | Edelstein et al. |
| 2012/0215592 A1 | 8/2012 | Amaru et al. |

FOREIGN PATENT DOCUMENTS

| | | |
|---|---|---|
| WO | 0115042 A2 | 3/2001 |
| WO | 0205137 A2 | 1/2002 |
| WO | 0231680 A1 | 4/2002 |
| WO | 02/080028 A1 | 10/2002 |
| WO | 02/099725 A1 | 12/2002 |
| WO | 0299725 A1 | 12/2002 |
| WO | 2005010653 A2 | 2/2005 |
| WO | 2006020343 A1 | 2/2006 |
| WO | 2006071928 A2 | 7/2006 |

OTHER PUBLICATIONS

Klein et al., "The Relation between Ontologies and schema languages" Vrije Universiteit Amsterdam, http:www.cs.vu.nl/~mcaklein/papers/oil-xmls.pdf.

Li et al., "Ontology-Based Intelligent Information Retrieval System," Canadian Conference on Electrical and Computer Engineering, May 2004, vol. 1Z, pp. 373-376.

Alles, "ATM Internetworking," Cisco Systems, Inc., May 1995, 26 pages.

Bechhofer et al., "An Informal Description of Standard OIL and Instance OIL," White Paper dated Nov. 28, 2000, 15 pages.

Benmohamed et al., "A Control-Theoretic ABR Explicit Rate Algorithm for ATM Switches with Per-VC Queueing," Proceedings of the Seventeenth Annual Joint Conference of the IEEE Computer and Communications Societies, Mar.-Apr. 1998, pp. 183-191.

Biron et al., "XML Schema Part 2: Datatypes," W3C Recommendation dated May 2, 2001, 5 pages. Retrieved Nov. 29, 2001 from http://www.w3.org/TR/xmlschema-2/.

Bray et al., "Extensible Markup Language (XML) 1.0 (Second Edition)," dated Oct. 6, 2000, 6 pages. Retrieved Nov. 29, 2001 from http://www.w3.org/TR/2000/Rec-xml-20001006.

Chiussi et al., "Virtual Queueing Techniques for ABR Service: Improving ABR/VBR Interaction," Proceedings of the Sixteenth Annual Joint Conference of the IEEE Computer and Communications Societies, Copyright 1997, pp. 406-418.

Clark et al., "XML Path Language (XPath) Version 1.0," W3C Recommendation dated Nov. 16, 1999, 4 pages. Retrieved Nov. 29, 2001 from http://www.w3.org/TR/1/xpath.

Clark, "XSL Transformations (XSLT), Version 1.0," W3C Recommendation dated Nov. 16, 1999, 5 pages. Retrieved Nov. 29, 2001 from http://www.w3.org/TR/xslt.

Decker et al., "Ontobroker: Ontology Based Access to Distributed and Semi-Structured Information," Proceedings of the Eighth Working Conference on Database Semantics—Semantic Issues in Multimedia Systems (DS-8), 1998, 20 pages.

European Search Report, dated Dec. 20, 2005, regarding Application No. EP02006919 (EP1327941), 3 pages.

Fallside, "XML Schema Part 0: Primer," W3C Recommendation dated May 2, 2001, 4 pages. Retrieved Nov. 29, 2001 from http://www.w3.org/TR/xmlschema-0/.

Genesereth, Knowledge Interchange Format draft proposed American National Standard (dpANS), NCITS. T2/98-004, 31 pages. Retrieved Jun. 21, 2001 from http://logic.stanford.edu/kif/dpans/html.

Ghani et al., "Hierarchical Scheduling for Integrated ABR/VBR Services in ATM Networks," Proceedings of the IEEE Global Telecommunications Conference (GLOBECOM '97), Nov. 1997, pp. 779-784.

Horrocks, "A Denotational Semantics for Standard OIL and Instance OIL," Department of Computer Science, University of Manchester, Nov. 2000, 9 pages.

Kitajima et al., "Integrating Information and Knowledge with Software Agents," Fujitsu Scientific and Technical Journal, vol. 36, No. 2, Dec. 2000, pp. 162-174.

Lassila "Introduction to RDF Metadata," W3 Consortium Note dated Nov. 13, 1997, 5 pages. Retrieved from http://www.w3.org/TR/NOTE-rdf-simple-intro.

Lassila et al., "Resource Description Framework (RDF) Model and Syntax Specification," W3 Consortium Recommendation dated Feb. 22, 1999, 48 pages. Retrieved from http://www.w3.org/TR/REC-rdf-syntax/.

Lin, "Constant-Time Dynamic ATM Bandwidth Scheduling for Guaranteed and Best Effort Services with Overbooking," Proceedings of the Sixteenth Annual Joint Conference of the IEEE Computer and Communications Societies, Apr. 1997, pp. 398-405.

Lublinsky, "Achieving the Ultimate EAI Implementation," eAI Journal, Feb. 2001, pp. 26-31.

Passmore et al., "The Virtual LAN Technology Report," Decisys, Inc., Copyright 1996, 22 pages.

Payton et al., "The Opportunity for Formal Models of Integration," Proceedings of the ISCA 2nd International Conference on Information Reuse and Integration, Nov. 2000, 15 pages.

Sowa, "Sample Ontology," In: Knowledge Representation: Logical, Philosophical, and Computational Foundations, Sowa (Ed.), Brooks/Cole, Pacific Grove, CA, 2000, 33 pages.

Swick et al., "Semantic Web Activity: Resource Description Framework (RDF)," dated Jun. 8, 2001, 7 pages. Retrieved Jun. 21, 2001 from http://www.w3.org/RDF/.

Thompson et al., "XML Schema Part 1: Structures," W3C Recommendation dated May 2, 2001, 6 pages. Retrieved Nov. 29, 2001 from http://www.w3.org/TR/xmlschema-1/.

Wadler, "A Formal Semantics of Patterns in XSLT," Markup Technologies, Mar. 2000, 15 pages.

Weiner, "Loading Converted Data Into the New SIS," VCC Utility Announcement dated Feb. 28, 2001, 6 pages. Retrieved from http://www.helpnet.ut.vccs.edu/ASC/Psoft/Advisories/LoadingConvertedLegacyData7.doc.

Yagoub et al., "Caching Strategies for Data-Intensive Web Sites," Proceedings of the 26th International Conference on Very Large Databases (VLDB '00), Sep. 2000, pp. 188-199.

"Architectures for Enterprise Application Integration," IBM Corporation, Aug. 6, 1999, 11 pages.

"LAN Emulation Over ATM, Version 2—LUNI Specification," The ATM Forum Technical Committee, AF-LANE-0084.000, Jul. 1997, 7 pages.

"Oracle 9i SQL Reference, Release 1 (9.0.1)," Oracle Corporation, A90125-01, Jun. 2001, 42 pages.

"The DARPA Agent Markup Language Homepage," dated Jun. 14, 2001, 2 pages. Retrieved Jun. 21, 2001 from http://www.daml.org.

"About DAML," dated May 4, 2001, 2 pages. Retrieved Jun. 21, 2001 from http://www.daml.org/about.html.

"DAML+OIL (Mar. 2001)," dated Mar. 27, 2001, 9 pages. Retrieved Jun. 21, 2001 from http://www.daml.org/2001/03/daml+oil-index.html.

RDF Code Revised Language Specification, dated Jun. 6, 2001, 9 pages. Retrieved from http://www.daml.org/2001/03/daml+oil.daml.

"Welcome to Oil," 2 pages. Retrieved Jun. 21, 2001 from http://www.ontoknowledge.org/oil/.

"Welcome to the Protégé Project," Protégé-2000, copyright 2001, 1 page. Retrieved Jun. 21, 2001 from http://smi.web.stanford.edu/projects/protege/.

What is Protégé-2000, copyright 2001, 1 page. Retrieved Jun. 21, 2001 from http://smi.web.stanford.edu/projects/protege/whatis/html.

"The Classes Tab," Protégé-2000, copyright 2001, 1 page. Retrieved Jun. 21, 2001 from http://smi-web.stanford.edu/projects/protege/classes.html.
"The Forms Tab," Protégé-2000, copyright 2001, 1 page. Retrieved Jun. 21, 2001 from http://smi-web.stanford.edu/projects/protege/forms.html.
"The Instances Tab," Protégé-2000, copyright 2001, 1 page. Retrieved Jun. 21, 2001 from http://smi-web.stanford.edu/projects/protege/instances.html.
Office Action, dated Jul. 6, 2005, regarding USPTO U.S. Appl. No. 09/866,101, 18 pages.
Response to Office Action, dated Nov. 7, 2005, regarding USPTO U.S. Appl. No. 09/866,101, 22 pages.
Notice of Allowance, dated Jan. 13, 2006, regarding USPTO U.S. Appl. No. 09/866,101, 23 pages.
Office Action, dated Mar. 15, 2004, regarding USPTO U.S. Appl. No. 09/904,457, 17 pages.
Final Office Action, dated Nov. 18, 2004, regarding USPTO U.S. Appl. No. 09/904,457, 15 pages.
Office Action, dated Apr. 4, 2005, regarding USPTO U.S. Appl. No. 09/904,457, 15 pages.
Notice of Allowance, dated Nov. 3, 2005, regarding USPTO U.S. Appl. No. 09/904,457, 6 pages.
Office Action, dated Sep. 28, 2005, regarding USPTO U.S. Appl. No. 10/053,045, 29 pages.
Response to Office Action, dated Jan. 25, 2006, regarding USPTO U.S. Appl. No. 10/053,045, 34 pages.
Final Office Action, dated May 3, 2006, regarding USPTO U.S. Appl. No. 10/053,045, 28 pages.
Response to Final Office Action, dated Jun. 30, 2006, regarding USPTO U.S. Appl. No. 10/053,045, 21 pages.
Office Action, dated Sep. 1, 2006, regarding USPTO U.S. Appl. No. 10/053,045, 23 pages.
Response to Office Action, dated Nov. 30, 2006, regarding USPTO U.S. Appl. No. 10/053,045, 28 pages.
Final Office Action, dated Feb. 12, 2007, regarding USPTO U.S. Appl. No. 10/053,045, 34 pages.
Office Action, dated Feb. 18, 2005, regarding USPTO U.S. Appl. No. 10/104,785, 10 pages.
Response to Office Action, dated May 18, 2005, regarding USPTO U.S. Appl. No. 10/104,785, 11 pages.
Response to Notice of Non-Compliant Amendment, dated Jun. 30, 2005, regarding USPTO U.S. Appl. No. 10/104,785, 25 pages.
Office Action, dated Jul 21, 2005, regarding USPTO U.S. Appl. No. 10/104,785, 10 pages.
Response to Office Action, dated Nov. 23, 2005, regarding USPTO U.S. Appl. No. 10/104,785, 24 pages.
Final Office Action, dated Dec. 15, 2005, regarding USPTO U.S. Appl. No. 10/104,785, 10 pages.
Response to Final Office Action, dated Feb. 15, 2006, regarding USPTO U.S. Appl. No. 10/104,785, 10 pages.
Notice of Allowance, dated Apr. 24, 2006, regarding USPTO U.S. Appl. No. 10/104,785, 6 pages.
Office Action, dated Apr. 5, 2005, regarding USPTO U.S. Appl. No. 10/159,516, 11 pages.
Response to Office Action, dated Jul. 5, 2005, regarding USPTO U.S. Appl. No. 10/159,516, 21 pages.
Final Office Action, dated Sep. 7, 2005, regarding USPTO U.S. Appl. No. 10/159,516, 15 pages.
Response to Final Office Action, dated Jan. 12, 2006, regarding USPTO U.S. Appl. No. 10/159,516, 21 pages.
Office Action, dated Jun. 7, 2006, regarding USPTO U.S. Appl. No. 10/159,516, 14 pages.
Response to Office Action, dated Sep. 7, 2006, regarding USPTO U.S. Appl. No. 10/159,516, 20 pages.
Final Office Action, dated Nov. 9, 2006, regarding USPTO U.S. Appl. No. 10/159,516, 14 pages.
Office Action, dated Feb. 4, 2009, regarding USPTO U.S. Appl. No. 10/302,370, 16 pages.
Response to Office Action, dated Apr. 28, 2009, regarding USPTO U.S. Appl. No. 10/302,370, 29 pages.
Notice of Allowance, dated Jun. 30, 2009, regarding USPTO U.S. Appl. No. 10/302,370, 4 pages.
Office Action, dated Mar. 8, 2006, regarding USPTO U.S. Appl. No. 10/340,068, 24 pages.
Response to Office Action, dated Jun. 30, 2006, regarding USPTO U.S. Appl. No. 10/340,068, 19 pages.
Final Office Action, dated Oct. 23, 2006, regarding USPTO U.S. Appl. No. 10/340,068, 23 pages.
Office Action, dated Apr. 7, 2006, regarding USPTO U.S. Appl. No. 10/637,339, 41 pages.
Response to Office Action, dated Jun. 30, 2006, regarding USPTO U.S. Appl. No. 10/637,339, 16 pages.
Office Action, dated Sep. 22, 2006, regarding USPTO U.S. Appl. No. 10/637,339, 42 pages.
Response to Office Action, dated Dec. 22, 2006, regarding USPTO U.S. Appl. No. 10/637,339, 31 pages.
Final Office Action, dated Mar. 27, 2007, regarding USPTO U.S. Appl. No. 10/637,339, 56 pages.
Appeal Brief, dated Jul. 25, 2007, regarding USPTO U.S. Appl. No. 10/637,339, 82 pages.
Examiner's Answer, dated Nov. 1, 2007, regarding USPTO U.S. Appl. No. 10/637,339, 75 pages.
Decision on Appeal, dated May 10, 2010, regarding USPTO U.S. Appl. No. 10/637,339, 12 pages.
Notice of Allowance, dated Jun. 2, 2010, regarding USPTO U.S. Appl. No. 10/637,339, 4 pages.
Notice of Allowance, dated Sep. 17, 2010, regarding USPTO U.S. Appl. No. 10/637,339, 16 pages.
Office Action, dated Mar. 6, 2009, regarding USPTO U.S. Appl. No. 10/637,171, 17 pages.
Final Office Action, dated Nov. 23, 2009, regarding USPTO U.S. Appl. No. 10/637,171, 32 pages.
Office Action, dated Dec. 17, 2008, regarding USPTO U.S. Appl. No. 10/821,464, 25 pages.
Final Office Action, dated Jul. 2, 2009, regarding USPTO U.S. Appl. No. 10/821,464, 27 pages.
Office Action, dated Jul. 8, 2009, regarding USPTO U.S. Appl. No. 11/029,966, 18 pages.
Final Office Action, dated Feb. 19, 2010, regarding USPTO U.S. Appl. No. 11/029,966, 16 pages.
Office Action, dated Jun. 21, 2010, regarding USPTO U.S. Appl. No. 11/029,966, 17 pages.
Notice of Allowance, dated Dec. 8, 2010, regarding USPTO U.S. Appl. No. 11/029,966, 33 pages.
Office Action, dated Oct. 5, 2010, regarding USPTO U.S. Appl. No. 11/219,039, 32 pages.
Final Office Action, dated Mar. 17, 2011, regarding USPTO U.S. Appl. No. 11/219,039, 16 pages.
Final Office Action, dated Nov. 16, 2011, regarding USPTO U.S. Appl. No. 11/219,039, 18 pages.
Office Action, dated Aug. 15, 2007, regarding USPTO U.S. Appl. No. 11/134,725, 19 pages.
Final Office Action, dated Jan. 24, 2008, regarding USPTO U.S. Appl. No. 11/134,725, 15 pages.
Notice of Allowance, dated Jul. 22, 2008, regarding USPTO U.S. Appl. No. 11/134,725, 11 pages.
Notice of Allowance, dated Apr. 11, 2011, regarding USPTO U.S. Appl. No. 12/253,798, 21 pages.
Notice of Allowance, dated Jul. 20, 2011, regarding USPTO U.S. Appl. No. 12/253,798, 8 pages.
Office Action, dated Aug. 9, 2007, regarding USPTO U.S. Appl. No. 11/165,650, 12 pages.
Final Office Action, dated Feb. 4, 2008, regarding USPTO U.S. Appl. No. 11/165,650, 8 pages.
Office Action, dated Apr. 16, 2010, regarding USPTO U.S. Appl. No. 11/165,650, 6 pages.
Notice of Allowance, dated Nov. 23, 2010, regarding USPTO U.S. Appl. No. 11/165,650, 21 pages.
Office Action, dated Nov. 26, 2007, regarding USPTO U.S. Appl. No. 11/182,455, 9 pages.
Final Office Action, dated Apr. 29, 2008, regarding USPTO U.S. Appl. No. 11/182,455, 8 pages.
Notice of Allowance, dated Aug. 13, 2008, regarding USPTO U.S. Appl. No. 11/182,455, 4 pages.

Office Action, dated Sep. 9, 2010, regarding USPTO U.S. Appl. No. 12/141,637, 21 pages.
Notice of Allowance, dated Feb. 7, 2011, regarding USPTO U.S. Appl. No. 12/141,637, 4 pages.
Office Action, dated Jul. 3, 2008, regarding USPTO U.S. Appl. No. 11/373,340, 30 pages.
Notice of Allowance, dated Jan. 8, 2009, regarding USPTO U.S. Appl. No. 11/373,340, 10 pages.
Office Action, dated Oct. 30, 2008, regarding USPTO U.S. Appl. No. 11/344,545, 9 pages.
Final Office Action, dated May 1, 2009, regarding USPTO U.S. Appl. No. 11/344,545, 11 pages.
Bechhofer et al., "Terminologies and terminology servers for information environments", Software Technology and Engineering Practice, 1997, Proceedings of the Eighth IEEE International Workshop on Incorporating Computer Aided Software Engineering, London, UK, Jul. 14, 1997, Los Alamitos, CA IEEE Comput. Soc. U.S.., Jul. 14, 1997, pp. 484-497.
Czejdo et al., "Automatic Generation of Ontology Based Annotations in XML and their use in retrieval systems," Proceedings of the first international conference on web information Systems engineering, 2000. pp. 296-300.
DeLoule, F et al. "Ontologies and Knowledge Representation", Intelligent Systems for the 21st century, IEEE International Conference on Tools with Artificial Intelligence, 2003, pp. 77-82.
Dimitrov et al., "XML Standards for Ontology Exchange", Proceedings of Ontolex: Ontologies and Lexical Knowledge Bases, Sep. 8, 2000, pp. 1-68.
Farquhar et al., "The Ontolingua Server: A Tool for Collaborative Ontology Construction", International Journal of Human-Computer Studies, Academic Press, New York, NY, vol. 46, No. 6, 1997, pp. 707-727.
Fernandes, Abilio. Snobase, May 2004, 18 pages.
Fikes et al, "Distributed Repositories of Highly Expressive Reusable Ontologies", IEEE Intelligent Systems, IEEE Computer Society, Los Alamitos, California, vol. 14, No. 2, 1999, pp. 73-79.
Green et al., Applying Ontologies to Business and Systems Modeling Techniques and Perspectives: Lessons Learned Journal of Database Management, 15(2), 105-117, Apr.-Jun. 2004 downloaded from: http://www.accessmylibrary.com/coms2/summary_0286-20574539_ITM (1 of 3), Jun. 25, 2009.
Greenhill S et al.: "Noetica: a tool for semantic data modeling", Information Processing and Management, Elsevier, Barking, GB, vol. 34., No. 6, Nov. 1998, pp. 739-760.
Hu et al., "Ontology-Based Medical Image Annotation with Description Logics", Proceedings 15th IEEE International Conference on Tools with Artificial Intelligence, 2003, pp. 77-82.
Jin et al., "A Methodology for Acquisition of Software Component Attribute Ontology", The Fourth International Conference on Computer and Information Technology, 2004, pp. 1058-1064.
McGuinness et al., "DAML+OIL: An Ontology Language for the Semantic Web", IEEE Intelligent Systems, 2002, pp. 1-9.
Mena et al., "Observer: An Approach for Query Processing in Global Information Systems Based on Interoperation Across Pre-Existing Ontologies", Cooperative Information Systems, 1996 Proceedings, First IFCIS International Conference on Brussells, Belgium, Jun. 19, 1996, Los Alamitos, CA, IEEE. pp. 14-25.
Rosemann et al., "Developing a meta model for the Bunge-Wand-Weber ontological Constructs", Information 27, 2002, pp. 75-91.
Ruiz et al., "A Proposal of a Software Measurement Ontology", Department of Computer Science University of Castilla-La Mancha, Dec. 3, 2008, http://frcu.utn.edu.ar/deptos/depto_3/32JAIIO/asse/asse_02.pdf.
SQL definition on Wikipedia download from http://en.wikipedia.org/wiki/SQL on Jun. 26, 2009.
Van Wegen et al, "Measuring the economic value of information systems", Journal of Information Technology (1996) 11, pp. 247-260.
Wang et al., "Ontology-based Web Knowledge Management", ICICS-PCM 2003, pp. 1859-1863.
Office Action, dated Oct. 26, 2012, regarding USPTO U.S. Appl. No. 13/421,611, 14 pages.

* cited by examiner

METHOD AND SYSTEM FOR FEDERATED QUERYING OF DATA SOURCES

CROSS REFERENCES TO RELATED APPLICATIONS

This application is a continuation-in-part of assignee's application U.S. Ser. No. 10/637,339, filed on Aug. 8, 2003, now U.S. Pat. No. 7,877,421, entitled "Method and System for Mapping Enterprise Data Assets to a Semantic Information Model," which is a continuation-in-part of assignee's application U.S. Ser. No. 10/340,068, filed on Jan. 9, 2003, now abandoned, entitled "Brokering Semantics between Web Services," which is a continuation-in-part of assignee's application U.S. Ser. No. 10/302,370, filed on Nov. 22, 2002, now U.S. Pat. No. 7,673,282, entitled "Enterprise Information Unification," which is a continuation-in-part of assignee's application U.S. Ser. No. 10/159,516, filed on May 31, 2002, now abandoned, entitled "Data Query and Location through a Central Ontology Model," which is a continuation-in-part of assignee's application U.S. Ser. No. 10/104,785, filed on Mar. 22, 2002, now U.S. Pat. No. 7,146,399, entitled "Run-Time Architecture for Enterprise Integration with Transformation Generation," which is a continuation-in-part of assignee's application U.S. Ser. No. 10/053,045, filed on Jan. 15, 2002, now abandoned, entitled "Method and System for Deriving a Transformation by Referring Schema to an Central Model," which is a continuation-in-part of assignee's application U.S. Ser. No. 09/866,101, filed on May 25, 2001, now U.S. Pat. No. 7,099,885, entitled "Method and System for Collaborative Ontology Modeling."

FIELD OF THE INVENTION

The present invention relates to management and querying of enterprise data.

BACKGROUND OF THE INVENTION

Information integration applications take data that is stored in two or more data sources and build from them one large database, possibly a virtual database, containing information from all of the sources, so that the data can be queried as a unit. Thus, for example, enterprise accounting data may be stored within a relational database, and enterprise inventory may be stored within XML documents. Information integration enables an enterprise to access its various data sources from within a single data store application.

Information integration is discussed in Chap. 20 of Garcia-Molina, H., Ullman, J. D. and Widom, J., "Database Systems: The Complete Book", Prentice-Hall, New Jersey, 2002. As pointed out in Sec. 20.1 of this reference, there are three basic modes of information integration: (i) federated databases, (ii) data warehousing, and (iii) mediation.

In a federated database architecture, data sources are independent, but one source can call on others to supply information.

In a data warehousing architecture, data from several sources is extracted and combined into a global schema. The data is then stored at the warehouse, which appears to the user like an ordinary database. Once data is in the warehouse, queries are issued by a user exactly as they would be issued to any database. However, user updates to the warehouse are generally forbidden, since they are not reflected in the underlying sources, and thus can make the warehouse inconsistent with the sources.

A data warehouse is updated periodically, by reconstructing it from current data in the data sources. Typically, a data warehouse is updated once a night, when the system can be shut down, so that queries are not issued while the warehouse is being constructed. Alternatively, the data warehouse may be incrementally updated based on changes that have been made to the data sources since the last time the warehouse was modified.

Conventional data warehouses are generally expensive and inflexible. In addition, such data warehouses generally do not provide real-time operation.

In a mediation architecture, a software component, referred to as a mediator, supports a virtual database, which a user may query as if it were physically constructed. The mediator stores no data of its own. Rather, it translates a query into one or more queries to its sources, synthesizes the answer to the query from the responses of the sources, and returns an answer to the user. A mediator supports a virtual view, or collection of views, that integrates several sources.

An example of a mediation system is the Enterprise Information Integrator (EII) of IBM Corporation, which generates a virtual warehouse. EII supports integrated querying across multiple data sources, including IBM DB2 relational databases, Microsoft SQL relational databases, and XML document databases.

All three of the approaches to information integration described above use transformers, referred to as wrappers or extractors, to transform data when it is extracted from a data source. Wrappers are used to pass ad-hoc queries to data sources, receive responses from the source, and pass information to an information integrator.

A drawback with conventional information integration is the lack of uniformity in semantics, and the lack of traceability back to individual data sources. Each database accessed by a warehouse generally has its own semantics, including inter alia names for tables and their fields, names for XML complex types and their elements, and data formats. It may happen that the same name is used in different contexts within different databases, or multiple names are used for the same construct, perhaps formatted differently for different names. Further complications that can arise with non-uniform semantics include inter alia, different inter-relationships between data constructs, different business rules relating the same data constructs, redundancies and inconsistencies.

It is thus desirable to be able to introduce a common semantic foundation for all of the data sources accessed within a data warehouse, and to provide a translation layer which enables a user to access data using queries expressed in common and meaningful semantics, and buffers the user from the individual semantics for the individual data sources.

SUMMARY OF THE DESCRIPTION

The present invention concerns use of common semantics for querying data within diverse types of data sources. The present invention provides a generic translation layer that buffers a user from the particulars of individual semantics for each data source, and enables the user to express queries in terms of common and meaningful semantics.

There is thus provided in accordance with a preferred embodiment of the present invention a system for managing and querying a plurality of data sources, including an interface to a plurality of inter-related data sources of diverse types, each of the plurality of data sources having a schema that describes its data structure, a schema generator communicating with the interface, for generating a federated schema that describes the structures of the plurality of data sources and their inter-relationships, and for modifying the federated schema over time as the plurality of data sources undergo changes, and a query generator communicating with the schema generator, for generating a query for the federated schema.

There is further provided in accordance with a preferred embodiment of the present invention a method for managing and querying a plurality of data sources, including generating a federated schema that describes the structures of a plurality of inter-related data sources and their inter-relationships, and for modifying the federated schema over time as the plurality of data sources undergo changes, wherein each of the plurality of data sources has a schema that describes its data structure, and generating a query for the federated schema.

There is yet further provided in accordance with a preferred embodiment of the present invention a computer-readable storage medium storing program code for causing a computer to perform the steps of generating a federated schema that describes the structures of a plurality of inter-related data sources and their inter-relationships, and for modifying the federated schema over time as the plurality of data sources undergo changes, wherein each of the plurality of data sources has a schema that describes its data structure, and generating a query for the federated schema.

BRIEF DESCRIPTION OF THE DRAWINGS

The present invention will be more fully understood and appreciated from the following detailed description, taken in conjunction with the drawings in which.

DETAILED DESCRIPTION

Enterprise data is typically distributed over multiple databases, referred to as data assets. Data assets can be of various types, including inter alia relational database tables, XML databases, entity-relationship (ER) databases and Cobol databases. Each data asset stores data according to a specific data structure format, referred to as a schema or as asset metadata. Asset metadata serves as descriptors, explaining how to interpret data stored within the asset. Without knowledge of asset metadata, data stored within an asset is generally unintelligible. Thus, for example, relational database tables store data according to a relational database schema, XML documents store data according to an XML schema, ER databases store data according to an ER logical model, and Cobol databases store data according to a Cobol Copybook. Each such schema is asset metadata, which explains how to interpret data stored within the asset.

Asset metadata is typically comprised of basic data structures, or constructs. For example, relational database schema are comprised of fields and tables, XML schema are comprised of simple types and complex types, ER logical models are comprised of entities and relationships, and Cobol Copybooks are comprised of elementary items and group items.

In a preferred embodiment of the present invention, semantics are provided to enterprise data through (i) a common ontology model, referred to also as an information model; and (ii) mappings of enterprise asset metadata into the ontology model. An ontology model is comprised of classes and properties, and is particularly useful for representing data in a semantically meaningful way. Mappings are associations of constructs of a first asset metadata with constructs of a second asset metadata in a consistent way. Mappings of asset metadata into the ontology model serve as dictionaries through which constructs of the asset metadata can be semantically understood.

Figure 1:
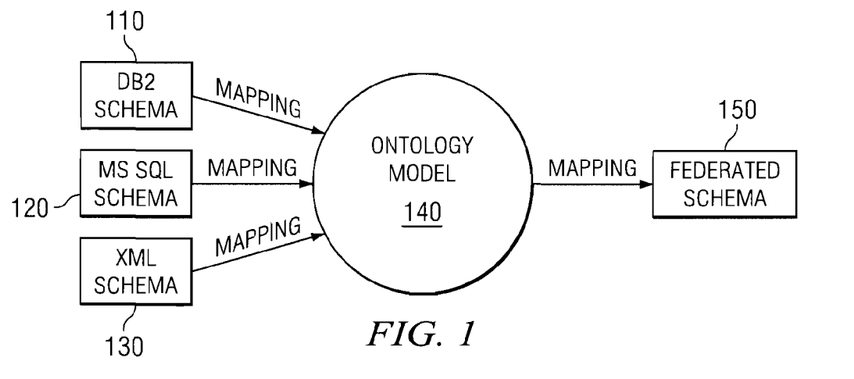
FIG. 1 is a simplified diagram of three schemas mapped into a central ontology, and a federated schema that combines the three schemas, in accordance with a preferred embodiment of the present invention.

Reference is now made to FIG. 1, which is a simplified diagram of three schemas, for three enterprise data assets, which are mapped into a central ontology, and a federated schema that combines the three schemas, in accordance with a preferred embodiment of the present invention. Shown in FIG. 1 are three conventional data schemas, an IBM DB2 schema 110 for a relational database, a Microsoft SQL schema 120 for a relational database, and an XML schema 130 for one or more XML documents. Each of schemas 110, 120 and 130 is individually mapped into a common ontology model 140.

Ontology model 140 preferably encapsulates substantially all of the constructs from schemas 110, 120 and 130, including inter alia database tables and their fields and their inter-relationships through foreign keys, and XML complex types and their elements and the type inter-relationships, as well as business rules that relate table fields to one another and XML elements to one another. Ontology model 140 serves not only to model enterprise data assets, but also provides common semantics for referencing the data assets.

The individual mappings of schemas 110, 120 and 130 into ontology model 140 can be inverted, and used to map ontology model 140 into a single federated schema 150. Federated schema 150 effectively combines the three individual schemas 110, 120 and 130. Moreover, federated schema inherits the common semantics of ontology model 140.

Figure 2:
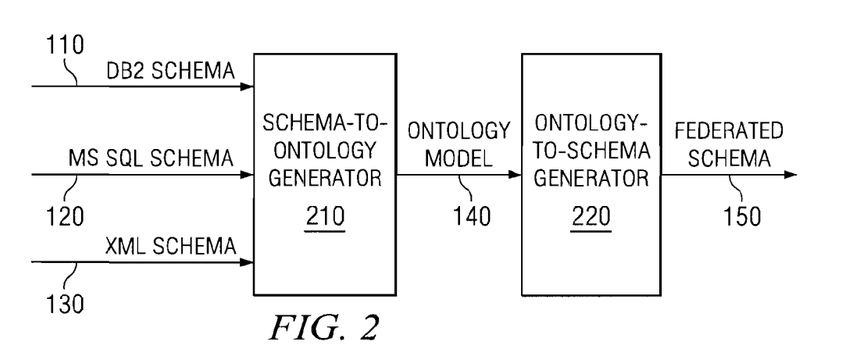
FIG. 2 is a simplified block diagram of a system that generates the federated schema of FIG. 1, in accordance with a preferred embodiment of the present invention.

Reference is now made to FIG. 2, which is a simplified block diagram of a system that generates the federated schema of FIG. 1, in accordance with a preferred embodiment of the present invention. Shown in FIG. 2 are the three schemas 110, 120 and 130 from FIG. 1, the ontology model 140 of FIG. 1 and the federated schema 150 from FIG. 1. Also shown in FIG. 2 is a schema-to-ontology generator 210, which generates ontology model 140 from the three schemas 110, 120 and 130, using mappings of the three schemas into the ontology model. Preferably, schema-to-ontology generator 210 acts as a reverse-engineer, and creates ontology classes and properties that correspond to the constructs of schemas 110, 120 and 130 and their inter-relationships. Preferably, schema-to-ontology generator 210 also generates business rules that inter-relate properties of ontology classes, corresponding to the business rules that apply to schemas 110, 120 and 130.

It may be appreciated by those skilled in the art that ontology model 140 may be alternatively generated without the use of schema-to-ontology generator 210. Thus, ontology model 140 may alternatively be an industry standard "off-the-shelf" model, or a custom ontology model generated with the use of an ontology modeling tool.

After ontology model 140 is generated, an ontology-to-schema generator 220 creates federated schema 150. Federated schema may be a relational database schema, or an XML schema or another schema. Preferably, ontology-to-schema generator 220 creates relational database tables and fields, or XML complex types and elements, which correspond respectively to the classes of ontology model 140 and their properties.

Figure 3:
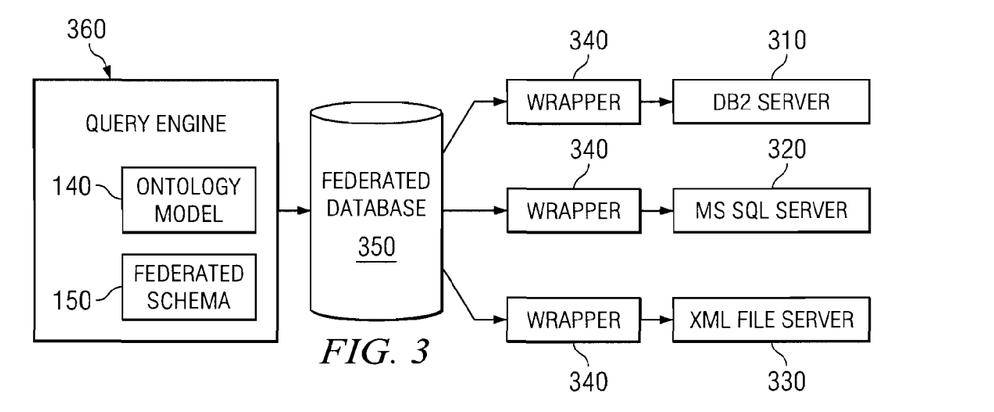
FIG. 3 is a simplified block diagram of an enterprise information system that uses the federated schema of FIG. 1 to query across multiple databases using common semantics, in accordance with a preferred embodiment of the present invention.

Reference is now made to FIG. 3, which is a simplified block diagram of an enterprise information system that uses the federated schema of FIG. 1 to query across multiple databases using common semantics, in accordance with a preferred embodiment of the present invention. Shown in FIG. 3 are three enterprise data assets; namely, a DB2 relational database 310, an MS SQL relational database 320, and a repository of XML documents 330. Each data asset includes a corresponding wrapper 340, which serves to identify the data asset. Preferably, wrappers include meta-data that identifies the server or servers that house the data asset, access control information including users and passwords, and the constructs that comprise the data assets.

Also shown in FIG. 3 is a federated database 350, such as IBM's DB2 Information Integrator, which supports access to the three databases 310, 320 and 330. Using federated database 350, the databases 310, 320 and 330 can be queried. However, in order to use federated database 350, a user must be intimately familiar with the semantics of the individual databases 310, 320 and 330.

By using federated schema 150 in accordance with the present invention, a generic translation layer can be generated, which buffers the user from the specific semantics of the individual databases 310, 320 and 330, and enables him to express database searches using the semantics of ontology model 140. Specifically, as shown in FIG. 3, the user can query the databases using a query engine 360, which conforms to ontology model 140. Query engine 360 generates and processes queries expressed generically in terms of ontology model 140 and, using the translation layer provided by federated schema 150, activates federated database 350 to query across the three databases 310, 320 and 330.

Figure 4:
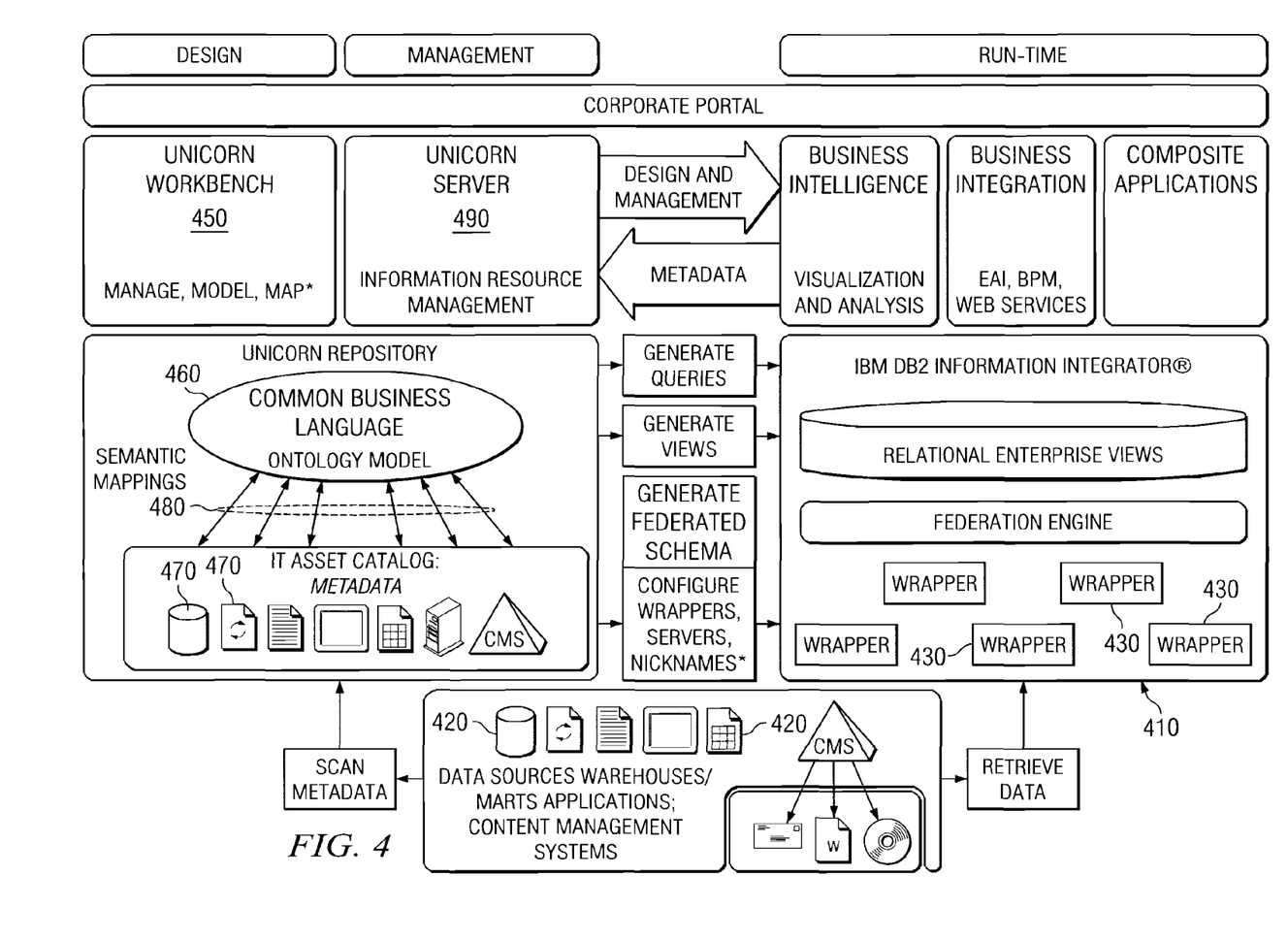
FIG. 4 is a detailed block diagram of the enterprise information system of FIG. 3, in accordance with a preferred embodiment of the present invention.

Reference is now made to FIG. 4, which is a detailed block diagram of the enterprise information system of FIG. 3, in accordance with a preferred embodiment of the present invention.

Shown in FIG. 4 is an information integrator 410. Information integrator 410 retrieves data from a plurality of data sources 420, using wrappers 430 to identify the locations and structures of data sources 420. Generally, each data source 420 conforms to a different naming system, making it difficult to work with more than a single data source at a time.

Also shown in FIG. 4 is a design environment 450, referred to as the Unicorn Workbench™. Design environment 450 provides a user workflow for generating an ontology model 460 and for mapping one or more data schemas 470 into ontology model 460 using semantic mappings 480. Data schemas 470 provide the necessary meta-data, or IT catalogue, for using the various data sources 420. As shown in FIG. 4, ontology model 460 preferably uses meaningful semantics, referred to as a common business language, thus making it easy and efficient to work with the many data sources 420 simultaneously.

After data schemas 470 have been mapped to ontology model 460 by Unicorn Workbench 450, the ontology model and semantic mappings are stored on a server 490, which provides a web portal into the enterprise data. A user of the portal formulates queries and generates views using the common business language, which are automatically converted to appropriate information integrator 450 names and executed within information integrator 450, and the results are converted back into the common business language—all transparent to the user. Preferably, view definitions are formulated in terms of a standard query language, such as SQL or XQuery.

The user also uses the common business language to run business applications including inter alia visualization and analysis tools. It may thus be appreciated that ontology model 460 and semantic mappings 480 obviate the need for the user to learn the intricacies of the data naming conventions for the individual data sources 420 and the inter-dependencies among their data.

Figure 5A:
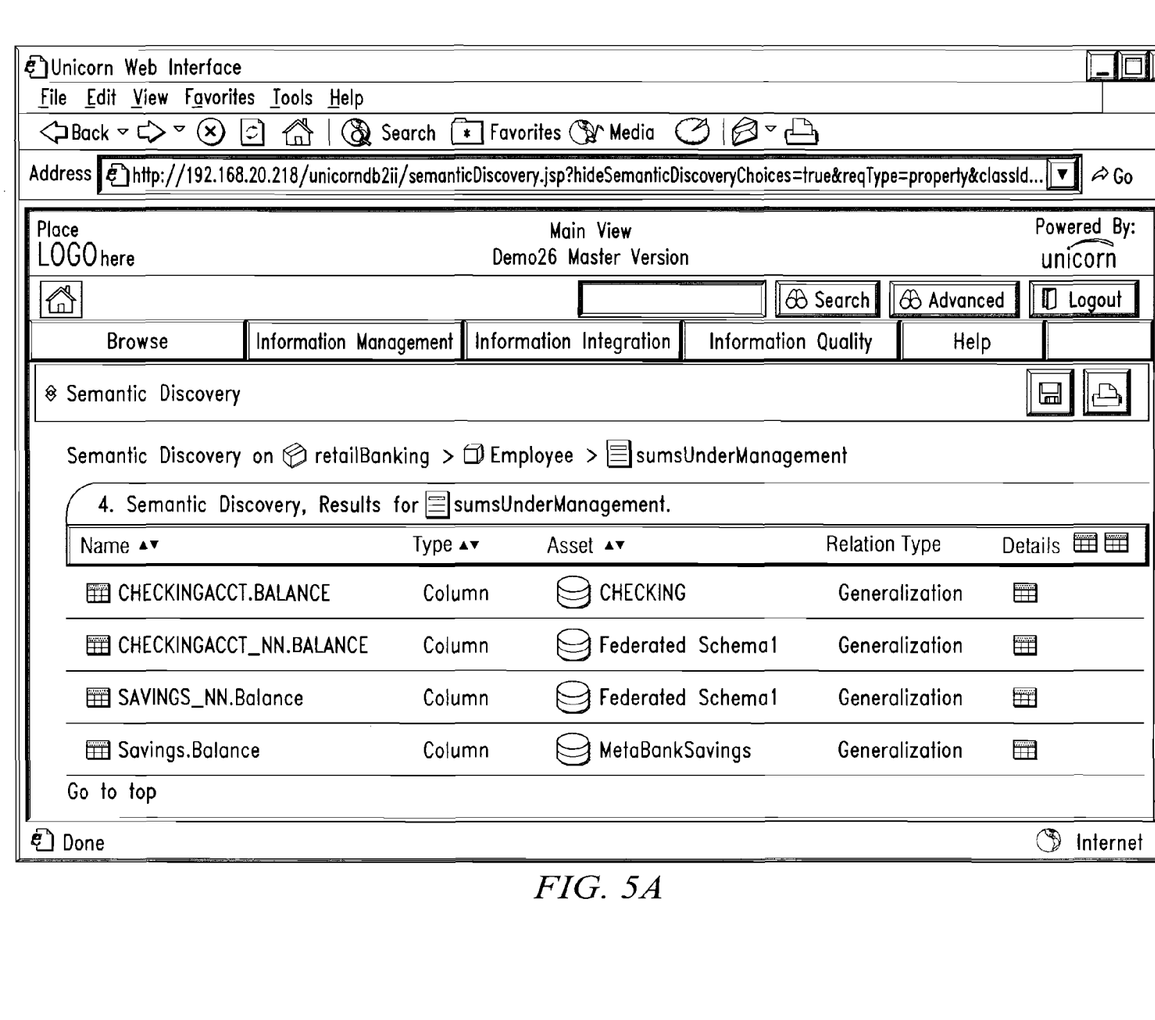
FIGS. 5A, 5B and 5C are illustrations of a user interface for semantic discovery and query, in accordance with a preferred embodiment of the present invention.
Figure 5B:
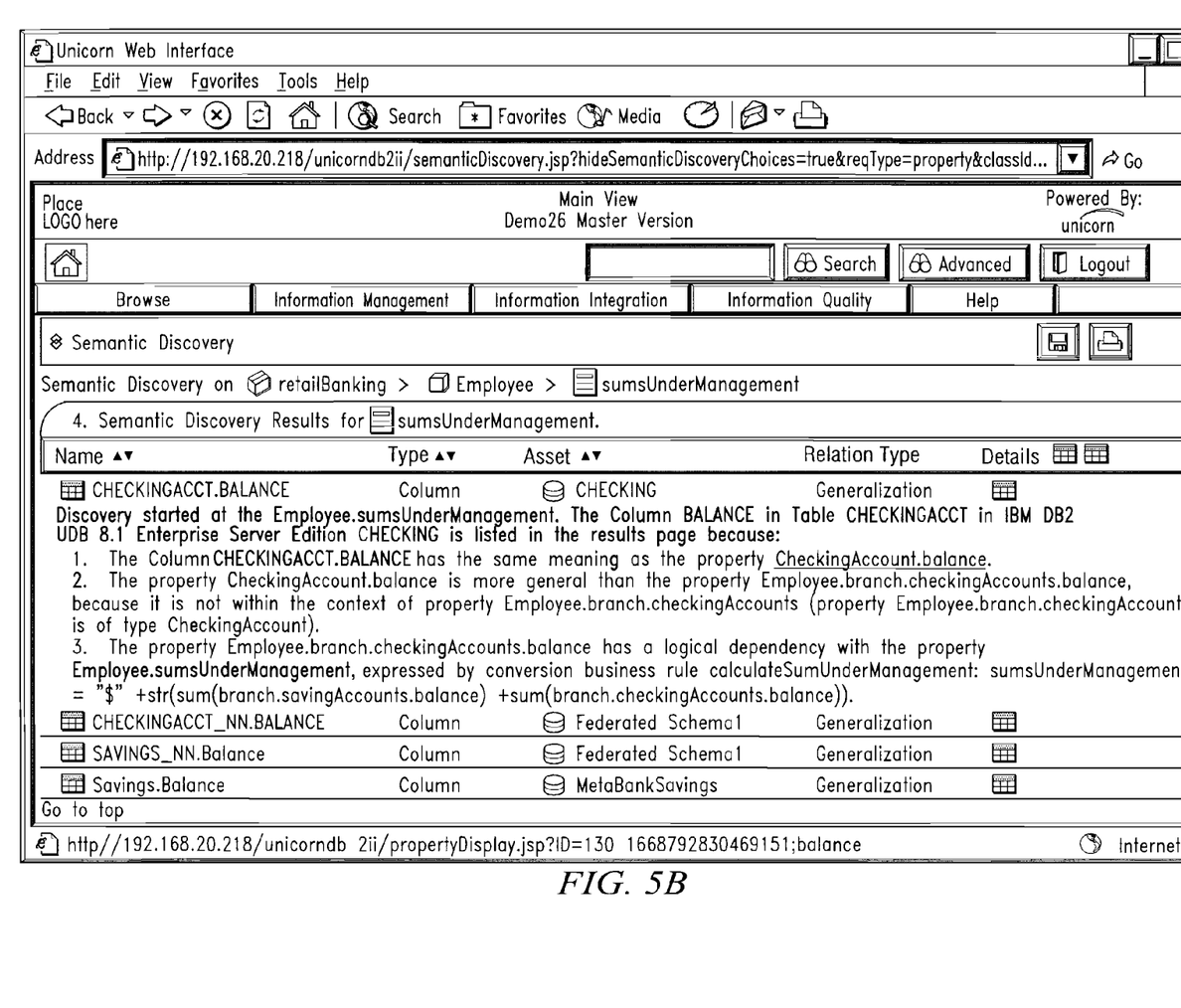
Figure 5C:
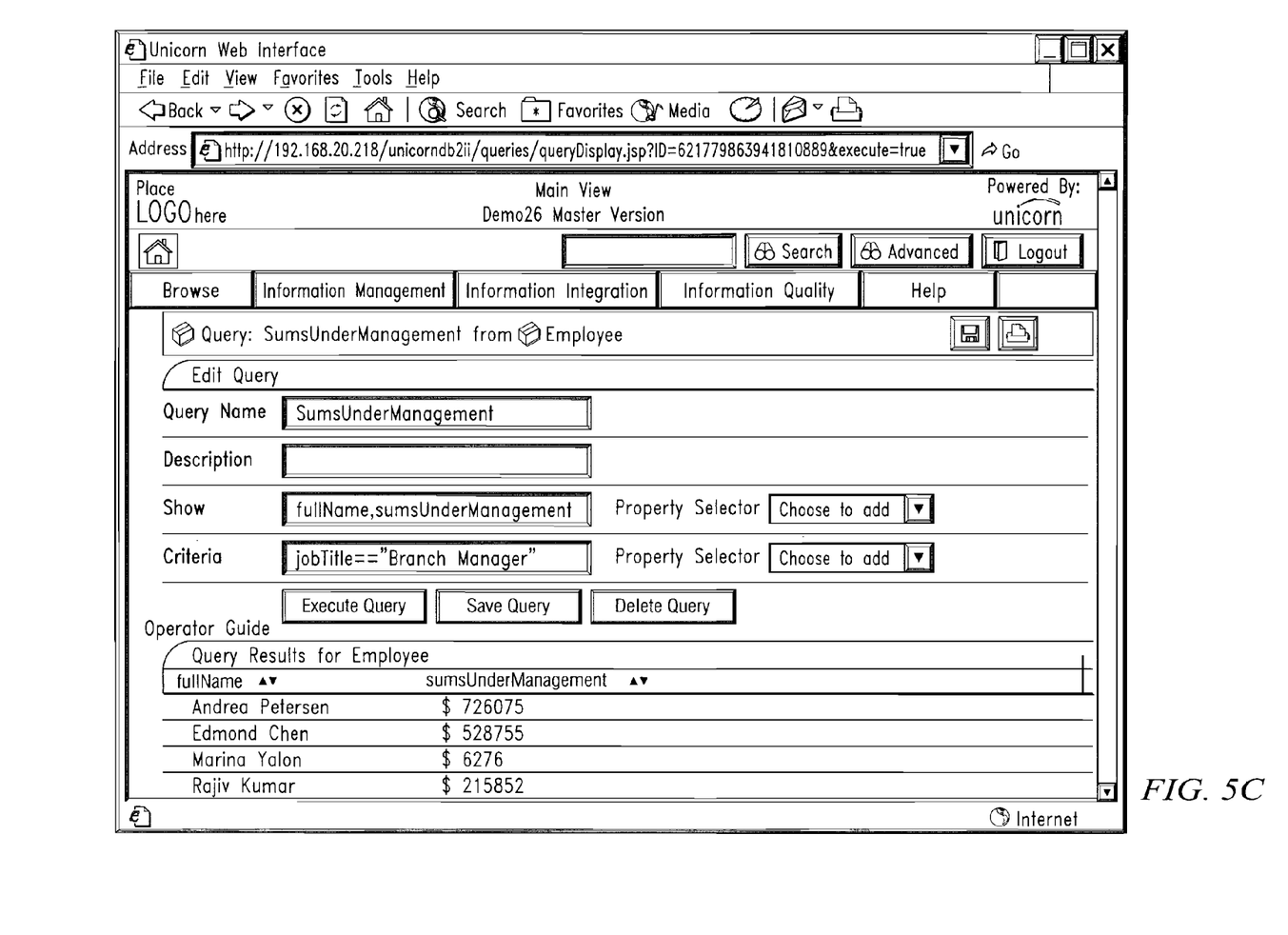

Reference is now made to FIGS. 5A, 5B and 5C, which are illustrations of a user interface for semantic discovery and query, in accordance with a preferred embodiment of the present invention. As shown in FIG. 5A, a search, referred to as "Semantic Discovery," for an ontology property named "sumsUnderManagement" of a class named "Employee," denoted Employee.sumsUnderManagement, produces four relational database tables for checking accounts and savings accounts, each having a column named "balance."

As shown in FIG. 5B, detailed information about the database tables is provided when a user clicks on the corresponding entry in FIG. 5A. Thus, according to a business rule named "calculateSumunderManagement," which relates properties of class Employee, the property sumsUnderManagement is determined by summing the properties branch.savingAccounts.balance and branch.checkingAccounts.balance. Moreover, the table "CHECKINGACCT" belongs to the DB2 relational database CHECKING, and the column "balance" of table CHECKINGACCT corresponds to the ontology property "balance" of ontology class "CheckingAccount."

Shown in FIG. 5C are query results for individual employees and the sums they manage. It may thus be appreciated that the present invention enables a user to (i) express a query that spans multiple databases residing on multiple servers, in terms of a coherent ontology property such as Employee.sumsUnderManagement; and (ii) discover the sources of the data required to determine the results of the query.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system, implemented in a data processing system, for managing and querying a plurality of inter-related data sources, the system comprising:
   an interface to the plurality of inter-related data sources of diverse types, wherein each of the plurality of inter-related data sources has a corresponding schema that describes a corresponding data structure of a corresponding data source;
   a schema generator communicating with said interface, wherein the schema generator generates a federated schema that describes structures of the plurality of inter-related data sources and inter-relationships of the plurality of inter-related data sources, and wherein the schema generator further modifies the federated schema over time as the plurality of inter-related data sources undergo changes;
a query generator communicating with said schema generator, wherein the query generator generates a query for the federated schema; and
a storage device in communication with the data processing system, the storage device operable to store the query.

2. The system of claim 1 further comprising a query engine communicating with said interface, wherein the query engine executes the query to the federated schema and for returning query results.

3. The system of claim 1 wherein said query engine is a component of a business process management environment.

4. The system of claim 1 further comprising a schema-to-ontology generator communicating with said interface and with said schema generator, wherein the schema-to-ontology generator maps the plurality of inter-related data sources into a common ontology model using semantic mappings, and wherein said query generator generates the query formulated in terms of nomenclature of the common ontology model.

5. The system of claim 4 further comprising a view generator communicating with the schema-to-ontology generator, wherein the view generator generates a database view of the plurality of inter-related data sources, using the federated schema, wherein the database view is formulated in terms of nomenclature of the common ontology model, and wherein said query generator generates the query for the database view.

6. The system of claim 5 wherein the database view is formulated using SQL statements.

7. The system of claim 5 wherein the database view is formulated using XQuery statements.

8. The system of claim 5 wherein said view generator updates the database view when the common ontology model is changed.

9. The system of claim 4 further comprising a portal communicating with the schema-to-ontology generator, wherein the portal manages user access privileges to the plurality of inter-related data sources, and wherein the user access privileges are expressed in terms of nomenclature of the common ontology model.

10. The system of claim 4 further comprising a data thesaurus communicating with the schema-to-ontology generator, wherein the data thesaurus looks-up a meaning of a data construct within the plurality of inter-related data sources, wherein the meaning is relative to the common ontology model.

11. The system of claim 10 wherein said data thesaurus traces an origin of a data construct within the plurality of inter-related data sources.

12. The system of claim 10 wherein said data thesaurus traces query results back to data sources.

13. The system of claim 4 wherein said query generator comprises a web-based user interface for creating and editing queries while browsing the common ontology model.

14. The system of claim 4 wherein the common ontology model includes classes, properties of classes, inheritances among classes, and business rules relating properties of classes, and wherein said query generator formulates a semantic query from an expression language that uses the classes, the properties, the inheritances, and the business rules.

15. The system of claim 14 further comprising a view generator communicating with the schema-to-ontology generator, wherein the view generator generates a database view of the plurality of inter-related data sources, using the federated schema, wherein the database view is formulated in terms an expression language that uses the classes, the properties, the inheritances, and the business rules, and wherein said query generator generates a query for the database view.

16. The system of claim 15 wherein said view generator automatically embeds the business rules within view definitions.

17. The system of claim 15 wherein said view generator updates the database view when a relevant business rule is changed.

18. The system of claim 4 wherein the common ontology model provides common semantics for referencing data assets, and wherein the common ontology model encapsulates constructs from the plurality of inter-related schemas, and wherein the constructs comprise:
database tables;
corresponding fields of the database tables;
interrelationships of the database tables through foreign keys;
XML complex types;
elements of the XML complex types;
type inter-relationships of the XML complex types; and
business rules that relate table fields to one another and XML elements to one another.

19. The system of claim 1 wherein the plurality of inter-related data sources of diverse types include at least one Microsoft SQL database and one XML document data source.

20. The system of claim 1 wherein the plurality of inter-related data sources of diverse types include at least one Microsoft SQL database and one IBM DB2 database.

21. The system of claim 1 wherein the plurality of inter-related data sources of diverse types include at least one XML document data source and one IBM DB2 database.

22. The system of claim 1 wherein said schema generator modifies the federated schema such that at least one of the plurality of inter-related data sources appears to be removed.

23. The system of claim 1 wherein said schema generator modifies the federated schema when a new data source is added to the plurality of inter-related data sources.

24. The system of claim 23 wherein said schema generator automatically detects and scans new data sources.

25. The system of claim 1 wherein said schema generator modifies the federated schema when one of the plurality of inter-related data sources is modified.

26. The system of claim 1 wherein the federated schema is an ontology model, and wherein each corresponding schema of the plurality of inter-related data sources is mapped to the ontology model.

27. A method, implemented in a data processing system, for managing and querying a plurality of inter-related data sources, the method comprising:
generating a federated schema that describes structures of the plurality of inter-related data sources and inter-relationships of the plurality of inter-related data sources;
modifying the federated schema over time as the plurality of inter-related data sources undergo changes, wherein each of the plurality of inter-related data sources has a corresponding schema that describes a corresponding data structure of a corresponding data source;
generating a query for the federated schema; and
storing the federated schema.

28. The method of claim 27 further comprising:
executing a query to the federated schema; and
returning query results.

29. The method of claim 28 wherein said executing is performed by a software application.

30. The method of claim 29 wherein said executing is performed by a business intelligence tool.

31. The method of claim 29 wherein said executing is performed within a business process management environment.

32. The method of claim 27 further comprising mapping the plurality of inter-related data sources into a common ontology model using semantic mappings, and wherein generating the query comprises formulating the query in terms of nomenclature of the common ontology model.

33. The method of claim 32 further comprising generating a database view of the plurality of inter-related data sources, using the federated schema, wherein the database view is formulated in terms of nomenclature of the common ontology model, and wherein generating the query comprises generating the query for the database view.

34. The method of claim 33 wherein the database view is formulated using SQL statements.

35. The method of claim 33 wherein the database view is formulated using XQuery statements.

36. The method of claim 33 wherein generating the database view comprises updating the database view when the common ontology model is changed.

37. The method of claim 32 further comprising managing user access privileges to the plurality of inter-related data sources, wherein user access privileges are expressed in terms of nomenclature of the common ontology model.

38. The method of claim 32 further comprising looking up a meaning of a data construct within the plurality of inter-related data sources, wherein the meaning is relative to the common ontology model.

39. The method of claim 38 wherein looking up comprises tracing an origin of a data construct within the plurality of inter-related data sources.

40. The method of claim 38 wherein looking up comprises tracing query results back to at least one data source.

41. The method of claim 32 wherein generating the query comprises employing a web-based user interface for creating and editing queries while browsing the common ontology model.

42. The method of claim 32 wherein the common ontology model includes classes, properties of classes, inheritances among classes, and business rules relating properties of classes, and wherein generating the query comprises formulating the query from an expression language that uses the classes, the properties, the inheritances, and the business rules.

43. The method of claim 42 further comprising generating a database view of the plurality of inter-related data sources, using the federated schema, wherein the database view is formulated in terms an expression language that uses the classes, the properties, the inheritances, and the business rules, and wherein generating the query comprises generating the query for the data base view.

44. The method of claim 43 wherein generating the database view comprises automatically embedding the business rules within view definitions.

45. The method of claim 43 wherein generating the database view comprises updating the database view when a relevant business rule is changed.

46. The method of claim 27 wherein the plurality of inter-related data sources of diverse types include at least one Microsoft SQL database and one XML document data source.

47. The method of claim 27 wherein the plurality of inter-related data sources of diverse types include at least one Microsoft SQL database and one IBM DB2 database.

48. The method of claim 27 wherein the plurality of inter-related data sources of diverse types include at least one XML document data source and one IBM DB2 database.

49. The method of claim 27 wherein generating the federated schema comprises modifying the federated schema such that at least one of the plurality of inter-related data sources appears to be removed.

50. The method of claim 27 wherein generating the federated schema comprises modifying the federated schema when a new data source is added to the plurality of inter-related data sources.

51. The method of claim 50 further comprising automatically detecting and scanning new data sources.

52. The method of claim 27 wherein generating the federated schema comprises modifying the federated schema when one of the plurality of inter-related data sources is modified.

53. A computer-readable storage medium storing program code for causing a computer to perform the steps of:
generating a federated schema that describes structures of the plurality of inter-related data sources and inter-relationships of the plurality of inter-related data sources;
modifying the federated schema over time as the plurality of inter-related data sources undergo changes, wherein each of the plurality of inter-related data sources has a corresponding schema that describes a corresponding data structure of a corresponding data source; and
generating a query for the federated schema.

* * * * *